(12) United States Patent
Stickle et al.

(10) Patent No.: US 10,523,716 B1
(45) Date of Patent: Dec. 31, 2019

(54) IMMUTABLE ACCOUNTS

(71) Applicant: Amazon Technologies, Inc., Seattle, WA (US)

(72) Inventors: Thomas Charles Stickle, Saint James, NY (US); Joshua Swaney, Arlington, VA (US); Blake Whaley, Fairfax, VA (US)

(73) Assignee: Amazon Technologies Inc., Seattle, WA (US)

( * ) Notice: Subject to any disclaimer, the term of this patent is extended or adjusted under 35 U.S.C. 154(b) by 91 days.

(21) Appl. No.: 15/274,940

(22) Filed: Sep. 23, 2016

(51) Int. Cl.
*H04L 29/06* (2006.01)
*H04L 12/24* (2006.01)

(52) U.S. Cl.
CPC ........ *H04L 63/205* (2013.01); *H04L 41/0813* (2013.01); *H04L 63/102* (2013.01)

(58) Field of Classification Search
CPC . H04L 63/102; H04L 63/205; H04L 41/0813; G04L 41/0813; G06Q 20/36; G06Q 20/38; G06Q 20/3678; G06Q 20/3829; G06Q 20/20; G06Q 20/3278; G06Q 20/4014; H04M 3/42; H04M 3/42136; A47F 5/08; A47F 5/0846
See application file for complete search history.

(56) References Cited

U.S. PATENT DOCUMENTS

| | | | | |
|---|---|---|---|---|
| 5,867,578 | A * | 2/1999 | Brickell | G06F 21/40 380/286 |
| 2005/0108021 | A1* | 5/2005 | Anderson | G06Q 10/10 709/205 |
| 2012/0063581 | A1* | 3/2012 | Chiczewski | H04M 3/42136 379/201.02 |
| 2013/0013505 | A1* | 1/2013 | Bryant | G06Q 20/22 705/44 |
| 2013/0304708 | A1* | 11/2013 | Ritchie | G06Q 30/02 707/687 |
| 2017/0004506 | A1* | 1/2017 | Steinman | G06Q 20/4014 |

\* cited by examiner

*Primary Examiner* — Thanhnga B Truong
(74) *Attorney, Agent, or Firm* — Davis Wright Tremaine LLP

(57) ABSTRACT

A computing resource service receives a request to perform a change to a configuration of a service provider account. In response to the request, the computing resource service determines if the service provider account has been designated as being immutable. If the service provider account is designated as being immutable, the computing resource service causes an account security service to transmit a notification to administrators of the service provider account to determine whether the administrators authorize the change to the service provider account. If the administrators approve of the requested change, the computing resource service fulfills the request.

20 Claims, 8 Drawing Sheets

Account Settings

Lock Settings — 402

| | Account Name |
|---|---|
| ☐ 406 | JCU_082443298138_ace |
| ☐ | ALF_070455818575_ffe |
| ☒ | ARJ_032199216857_dac |
| ☒ | TNM_052957440761_cbe |
| ☐ | BWF_519698990009_aab |
| ☒ | GKG_248995132576_bbc |

404

Custom Message:

This account has been locked. To change the configuration of this account, please contact Fulano De Tal at 555-1234.

— 408

[ SUBMIT ] — 410

IMMUTABLE ACCOUNTS

BACKGROUND

As computing resource services expand to accommodate more customers, security teams are often used as a primary point of control for service accounts. These security teams often delegate responsibility for managing these accounts to application teams. However, security teams may want to prevent permanent configuration changes to these accounts in order to maintain a desired configuration for these accounts. For example, security teams and other administrators of these accounts may utilize a process to detect and reverse any configuration changes to these accounts. However, creating an automated process to detect and reverse any configuration changes may require a significant amount of time from the security teams. Additionally, there may be a lag between detection of a configuration change and the reversal of such a change.

BRIEF DESCRIPTION OF THE DRAWINGS

Various techniques will be described with reference to the drawings, in which:

FIG. 4 shows an illustrative example of a user interface provided by an account security service for making one or more accounts immutable in accordance with at least one embodiment;

DETAILED DESCRIPTION

Figure 1:
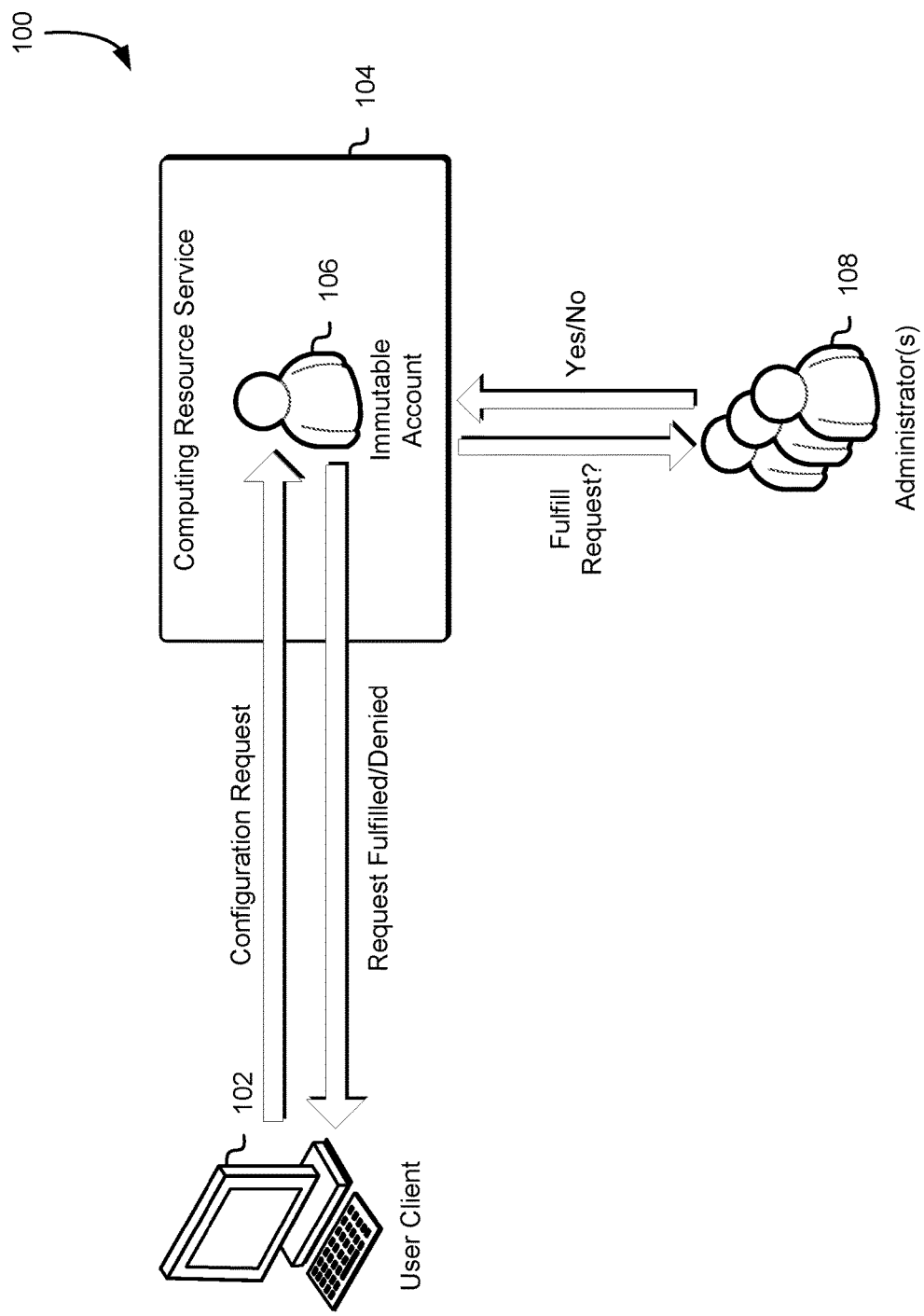
FIG. 1 shows an illustrative example of an environment in which an immutable account is subject to administrator approval for any configuration changes in accordance with at least one embodiment.

This disclosure relates to the configuration and management of immutable accounts to make configuration changes to the immutable accounts subject to administrator approval. In an example, a security principal or other administrator of an account accesses an account security service provided by a computing resource service provider to designate an account as immutable. The account security service may provide the security principal or other administrator of an account with a user interface that the security principal or other administrator may use to select which accounts are to be designated as immutable. The user interface may present the security principal or other administrator with an ordering of the accounts that it is authorized to manage and, for each account specified in the ordering of the accounts, an option to specify whether an account is to be immutable or not. If the security principal or other administrator submits a request, through the user interface, to make an account immutable, the account security service may update an account database to specify that the selected account is immutable.

In one example, in response to a request from a user to change the configuration of an account, the computing resource service to which the request was made determines whether the user is authorized to change the configuration of the specified account. For instance, the computing resource service that received the request may determine which policies are applicable to the request, including any policies that may be applicable to the user, the role assumed by the user, and the account itself. Based on these applicable policies, the computing resource service may determine whether the user is authorized to change the configuration of the account. If the user is authorized to change the configuration of the account, the computing resource service may submit a request to the account security service to determine whether the account is designated as being immutable. The request from the computing resource service may specify the configuration change requested by the user. In response to the request, the account security service may access its account database to determine whether the specified account has been designated as being immutable.

If the specified account is not immutable, the account security service may transmit a notification to the computing resource service to indicate that the account is not immutable. In response to this notification, the computing resource service may enable the user to perform the desired configuration change. However, if the account has been designated as immutable, the account security service may perform an approval workflow to determine whether the user can perform the desired configuration change. For instance, the account security service may identify the security principals or other administrators of the account that are authorized to approve or deny any configuration changes for the account. Further, for these security principals and administrators of the account, the account security service may identify any rules that may be used to determine the conditions for approval of the configuration change. For instance, a rule may specify how many administrators or security principals are required to approve the configuration change and thereby form a quorum. If a quorum is not formed or a minimum number of administrators and security principals elect to deny the configuration change, the request from the user to perform the configuration change may be denied.

In some examples, if a quorum of administrators and security principals is formed indicating approval of the configuration change, the account security service transmits a notification to the computing resource service to indicate that the request can be fulfilled. In response to this notification, the computing resource service may fulfill the request by enabling the user to change the configuration of the account as specified in the request. In some instances, the user may be granted a period of time to make the requested configuration change to the account or to perform additional configuration changes. The account database maintained by the account security service may be updated to denote any configuration changes to the account. This may allow the account security service to automatically revert the account to its original configuration prior to any changes made by the user. Alternatively, if the configuration change is to be permanent, the account security service may update the account database to specify the new default configuration for the account.

In this manner, a security team can designate an account as immutable, thereby preventing other users from changing the configuration of the account without the approval of security principals and other administrators of the account. In addition, the techniques described and suggested in this disclosure enable additional technical advantages. For instance, because a security principal or administrator of an account may designate the account as being immutable or mutable at any time, a security team may manage the mutability of an account quickly, thereby controlling how configuration changes to the account are performed. Further, because configuration changes to immutable accounts are subject to the approval workflow, the account security service may track any approved configuration changes to an account in the account database. This may allow a security principal or other administrator of the account to use the account security service to identify any configuration changes and undo these configuration changes to revert the account to its default state.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which an immutable account 106 is subject to administrator approval for any configuration changes in accordance with at least one embodiment. In the environment 100, a customer of a computing resource service provider, through use of an interface provided by the computing resource service provider via a user client 102, may transmit a request to a computing resource service 104 to change the configuration of an account. In order for the customer to interact with the interface provided by the computing resource service provider and access the computing resource service 104, the customer may be required to provide credential information for authentication to a graphical user interface (GUI), whereby the GUI may utilize the provided credential information to generate a digital signature or hash that may be utilized for authentication. The credential information may include, among other things, a username, a corresponding password, biometric information, a cryptographic key, a unique identifier, a set of credentials, a hash of the set of credentials, a digital signature generated using a credential, a message authentication code generated based at least in part on a credential, and the like. The computing resource service provider may utilize the obtained digital signature or hash from the GUI to authenticate the customer and determine whether the customer may utilize the computing resource service provider interface to access the computing resource service 104. Further, the computing resource service provider may utilize the obtained digital signature or hash from the GUI to identify one or more policies applicable to the customer to determine whether the customer is authorized to change the configuration of the account. The account may be used to manage users of computing resources provided by the computing resource service 104 and permissions for each of these users. Thus, a change to the configuration of the account may include the changes to the operations that may be performed by users of the account, the functionality of the account, the users that are associated with the account, and the like.

In some embodiments, the account may be immutable, such as immutable account 106. A security principal or other administrator of the account may access an account security service provided by the computing resource service provider to designate an account as immutable. For instance, the account security service may utilize credential information for the security principal or other administrator to identify any accounts that the security principal or other administrator is responsible for. The account security service may provide the security principal or other administrator with a GUI that is used to present an ordering of the accounts that the security principal or other administrator is permitted to manage and configure. For each account specified in the GUI, the account security service may provide the security principal or other administrator with an option to designate the account as immutable. Additionally, through the GUI, the security principal or other administrator of an account may provide a custom message that may be displayed to a customer or other user if it submits a request to change the configuration of an account designated as immutable.

The security principal or other administrator of an account may generate, through the account security service, one or more quorum rules which may be used to determine whether a quorum has been formed for approval of an incoming request to change the configuration of an immutable account 106. For instance, the account security service may evaluate responses from administrators 108 of the immutable account 106 to determine whether a quorum may be reached in order to make a determination as to whether a configuration change to the account may be made. As an illustrative example, a quorum rule may specify that a minimum number of administrators 108 are required to approve the configuration change in order for the request from the customer to change the configuration of the account to be fulfilled. If a quorum cannot be reached for a particular configuration change request, the account security service may determine whether a timeout period has elapsed for the request or if a quorum remains possible after evaluation of the received administrator responses. If the timeout period has elapsed or a quorum is not possible, the account security service may determine that the configuration change request cannot be fulfilled.

It should be noted that while quorums requiring a minimum number of responses indicating approval of a configuration change are used throughout the present disclosure for illustrative purposes, quorums may be defined based at least in part on different criteria. For example, a quorum may be reached when a majority of the administrators 108 have returned a response indicating approval of the configuration change. Alternatively, a quorum may be reached if a minimum number of responses indicating approval of the configuration change are received, regardless of the size of the group of administrators 108 and other security principals having the authority to approve or deny configuration changes for an immutable account 106. However, this minimum number may also be greater than two in some instances. In other embodiments, each administrator of the group of administrators 108 is assigned a distinct weight based at least in part on the hierarchical position of the administrator. For instance, a greater weight may be assigned to an administrator that has a higher position in the hierarchy of administrators 108. Alternatively, a lower weight may be assigned to an administrator that has a lower position in the hierarchy of administrators 108. This weighing may be used to generate a score that may be used to determine whether a quorum has been formed for the approval of a requested configuration change to the immutable account 106.

In response to the request provided by the user client 102 on behalf of a customer, the computing resource service 104 may determine whether the target account is immutable. For instance, the computing resource service 104 may transmit a request to the account security service to determine if the account specified in the request from the user client 102 is immutable. In response to the request from the computing resource service 104, the account security service may access an account database to identify an entry corresponding to an identifier of the account. The entry for the account may specify whether the account has been designated as being immutable, the administrators 108 authorized to determine whether a configuration change request may be approved, and any quorum rules for establishing whether the request has been approved or denied. If the account is not immutable, the account security service may transmit a notification to the computing resource service 104 to indicate that the request from the user client 102 may be fulfilled. However, if the account security service determines, based at least in part on the entry for the account in the account database, that the account is immutable, the account security service may identify the one or more administrators 108 and other security principals that are authorized to determine whether any configuration changes may be made to the immutable account 106. It should be noted that mutability of an account, as specified in the account database, may be by designation or a lack of a designation of mutability.

In an embodiment, the account security service accesses (e.g., by transmitting a request to and/or otherwise electronically interacting with) a notification service to publish a notification to a subject corresponding to the immutable account. The one or more administrators 108 and other security principals may be subscribed to the subject such that any message published to the subject may be delivered to the one or more administrators 108 and other security principals. The one or more administrators 108 and other security principals may obtain the notification published to the subject from the notification service and determine whether the account configuration change request may be fulfilled. Each administrator or security principal may provide its response to the request to the account security service, which may use these responses to determine whether a quorum has formed for approval of the account configuration change request or for the denial of the request.

If the account security service determines, based at least in part on the responses from the administrators 108 and other security principals of the immutable account 106, that the account configuration change request is denied, the account security service may transmit a notification to the computing resource service 104 indicating that the request has been denied. This may cause the computing resource service 104 to transmit a notification to the user client 102 to inform the customer that the request was denied. Additionally, the computing resource service 104 may provide the customer with a custom message generated by the administrator or other security principal that designated the account as being immutable. For example, the custom message may specify the entity that designated the account as immutable and contact information for the one or more administrators 108 or other security principals that have the authority to restore access to the immutable account 106 for performance of any configuration changes.

Alternatively, if the account security service determines that the account configuration change request can be fulfilled, the account security service may transmit a notification to the computing resource service 104 indicating that the request can be fulfilled. This may cause the computing resource service 104 to enable the user client 102 to access the immutable account 106. Additionally, the computing resource service 104 may transmit a notification to the user client 102 to inform the customer that the request has been approved. Thus, the customer, through the user client 102, may access the immutable account 106 to make the requested configuration change. In some embodiments, if the customer terminates its access to the immutable account 106, the account security service may access the immutable account 106 to revert the immutable account 106 to its configuration prior to any changes made by the customer. For instance, the account security service may use the account database to identify the default configuration for the immutable account 106. The account security service may return the immutable account 106 to this default configuration.

Figure 2:
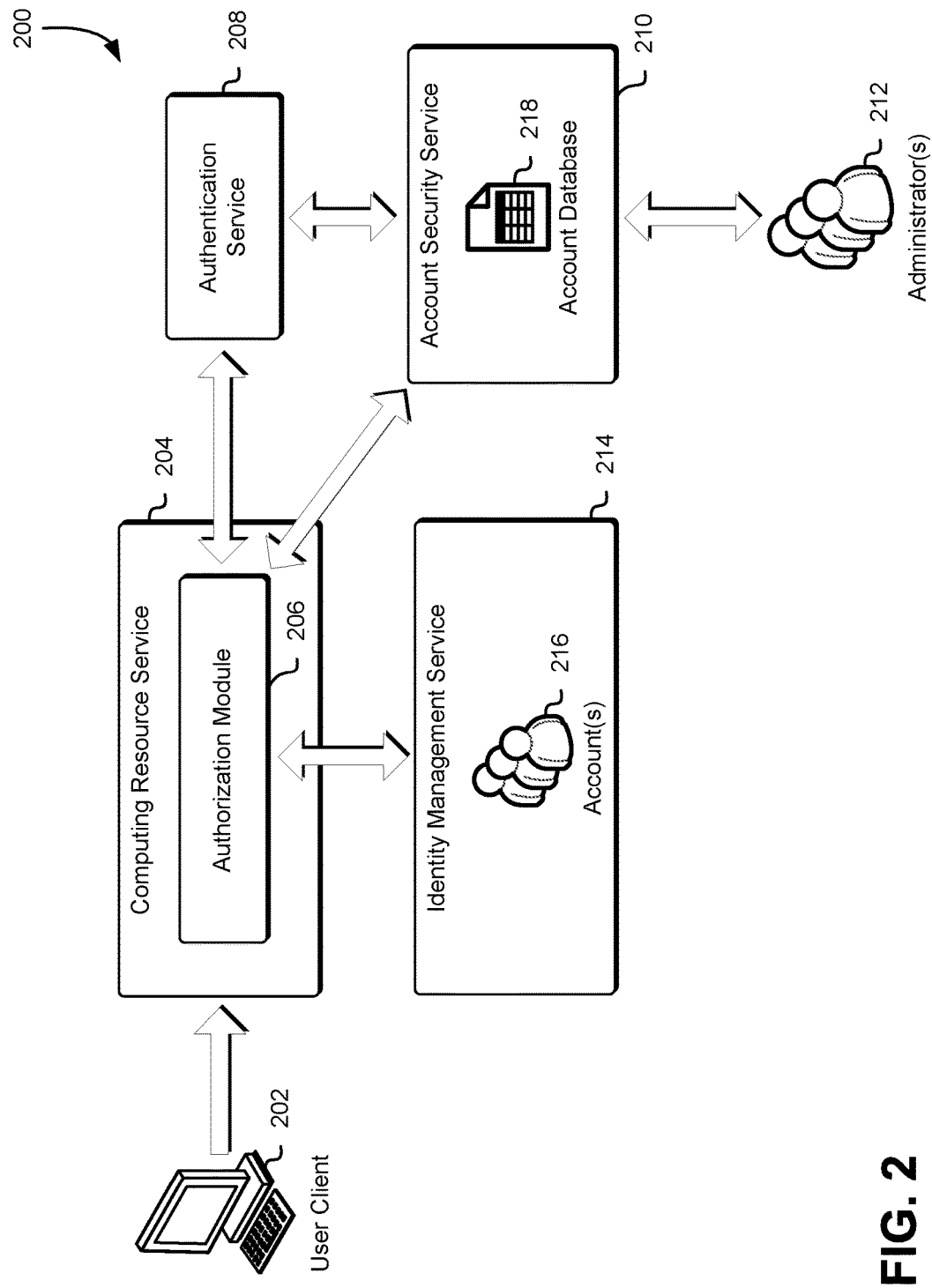
FIG. 2 shows an illustrative example of an environment in which a request to change the configuration of an account is processed in accordance with at least one embodiment.

As noted above, an administrator or other security principal may access an account security service provided by the computing resource service provider to designate one or more accounts as being immutable (e.g., locked to prevent any configuration changes). If an account is designated as being immutable, any customer requests to change the configuration of the account are provided to a designated group of administrators and security principals for the account for approval. If the requested configuration change is not approved, the customer's request is denied and the configuration for the immutable account is maintained. Alternatively, if the requested configuration change is approved by the group of administrators and security principals, the customer may access the immutable account to perform the requested configuration change. Accordingly, FIG. 2 shows an illustrative example of an environment 200 in which a request to change the configuration of an account is processed in accordance with at least one embodiment.

In the environment 200, a customer may utilize a user client 202 to access a computing resource service 204 provided by a computing resource service provider to request a configuration change to an account. For example, the customer may submit a request to configure an account to enable logging of account activity. In its request, the customer may provide credential information for authentication to the computing resource service 204, which may provide the credential information to an authentication service 208 for verification. The authentication service 208 may be a stand-alone service or may be part of a service provider or other entity. The authentication service 208, in an embodiment, is a computer system configured to perform operations involved in authentication of customers and other entities. The authentication service 208 may evaluate the provided credential information to determine if the customer can be authenticated. If the customer cannot be authenticated, the authentication service 208 may transmit a notification to the computing resource service 204 indicating that the customer could not be authenticated. This may cause the computing resource service 204 to deny the request.

If the customer is successfully authenticated, the authentication service 208 may obtain policies applicable to the request. A policy may be applicable to the request by way of being associated with the customer, the account to be accessed as part of fulfillment of the request, a group in which the customer is a member, a role the customer has assumed, and/or otherwise. Having obtained any policies applicable to the request, the authentication service 208 may provide an authentication response and, if applicable, the obtained policies back to the computing resource service 204. The computing resource service 204 may check whether fulfillment of the request for performance of the configuration change would comply with obtained policies using an authorization module 206. An authorization module 206 may be a process executing on the service frontend that is operable to compare the request to the one or more permissions in the policy to determine whether service may satisfy the request (i.e., whether fulfillment of the request is authorized). If the authorization module 206 is not able to match the request to a permission specified by the policy, the authorization module 206 may execute one or more default actions such as, for example, providing a message to the service that causes the service to deny the request, and causing the denied request to be logged. If the authorization matches the request to one or more permissions specified by the policy, the authorization module 206 may resolve this by selecting the least restrictive response (as defined by the policy) and by informing the service whether the fulfillment of the request is authorized (i.e., complies with applicable policy) based on that selected response.

In an embodiment, if the authorization module 206 determines, based at least in part on the obtained policies, that the customer is authorized to make configuration changes to the account, the authorization module 206 may transmit a request to an account security service 210 to determine whether the account specified in the request from the customer is an immutable account. The account may be maintained by an identity management service 214, which may comprise various computer systems for enabling administrators 212 to define a level of access to other services through the creation and use of service accounts 216. An administrator may access the identity management service 214 to create and manage one or more accounts that may be utilized by users to access the services provided by the computing resource service provider. A customer may utilize the identity management service 214, in conjunction with a policy management service, to generate one or more policies, which may be used to define a level of access to the computing resource service 204 and any other service provided by the computing resource service provider.

In some embodiments, an administrator or other security principal of an account managed by the identity management service 214 can access the account security service 210 to designate the account as immutable. The account security service 210, in response to a request from an administrator or other security principal to designate an account as immutable, may provide the credential information for the administrator or other security principal to the authentication service 208 for verification. If the administrator or other security principal is successfully authenticated, the authentication service 208 may obtain any policies applicable to the request and provide these policies to the account security service 210. The account security service 210 may utilize these policies to determine whether the administrator or other security principal is authorized to designate accounts as being immutable. If the administrator or other security principal is not authorized to designate accounts as being immutable, the request may be denied.

If the administrator or other security principal is authorized to designate their accounts as immutable, the account security service 210 may identify the one or more accounts 216 which the administrator or other security principal is authorized to access. For instance, the account security service 210 may access the identity management service 214 to request information for accounts managed by the administrator or other security principal. This request may include an identifier for the administrator or other security principal, which the identity management service 214 may use to identify the accounts 216. This information is provided to the account security service 210, which may use the information to generate an ordering of accounts that the administrator or other security principal may designate as immutable. For instance, the account security service 210 may present the administrator or other security principal with an interface that may include the ordering of accounts and an option, for each account, to designate the account as immutable. The account security service 210 may also maintain an account database 218 that may be used to track the mutability state for each account and the administrators 212 associated with each account. The account database 218 may specify, for each account of the plurality of accounts 216, one or more attributes of the account including whether the account has been designated as being immutable.

If the administrator or other security principal designates an account to be immutable, the account security service 210 may update the account database 218 to indicate that the specified account is immutable. For instance, the account security service 210 may update an entry corresponding to the selected account to indicate that the account is immutable. In some embodiments, the administrator or other security principal can define the quorum rules to be applied to determine whether requests to change the configuration of the immutable account may be approved and the one or more administrators 212 and other security principals that have the authority to vote as to whether such requests should be approved or not.

In response to a request from the authorization module 206 to determine whether the account specified in the request from the customer is immutable, the account security service 210 may use the account database 218 to identify an entry corresponding to the specified account. If the entry specifies that the account is not immutable, the account security service 210 may return a response to the authorization module 206 to indicate that the request may be fulfilled. This may cause the authorization module 206 to access the identity management service 214 to perform the requested configuration change. Alternatively, the authorization module 206 may transmit a notification to the user client 202 to indicate that the request can be fulfilled. The authorization module 206 may enable the customer, through the user client 202, to access the account through the identity management service 214 and perform the desired configuration change.

If the account security service 210 determines that the specified account is immutable, the account security service 210 may utilize the account database 218 to identify the one or more administrators 212 and other security principals authorized to determine whether a configuration change may be performed. Alternatively, the account database 218 may specify an identifier for a subject to which administrators 212 and other security principals for the account may be subscribed. This subject may be maintained by a notification service, which may transmit messages added to a subject to recipients subscribed to the subject. Thus, the account security service 210 may transmit the request for a configuration change to the account to the one or more administrators 212 and security principals specified in the account database 218 or to a designated subject managed by the notification service for delivery to the one or more administrators 212 and security principals.

The administrators 212 and other security principals may review the customer request and may each make a determination as to whether the request may be fulfilled or denied. Each administrator or other security principal may provide its response to the request to the account security service 210, which may consolidate the received responses to determine whether a quorum has been formed for making a determination regarding the request. For instance, if a quorum is formed that indicates that the request is not approved or if a quorum cannot be formed, the account security service 210 may transmit a notification to the authorization module 206 to indicate that the request should be denied. This notification may include a custom message generated by the administrator or other security principal as part of the process to make the account immutable. This custom message may indicate that the configuration of the account cannot be modified and may include contact information for the administrator or group of administrators 212 responsible for managing the account.

If the account security service 210 determines, based at least in part on the responses obtained from administrators 212 and other security principals for the account, that a quorum has been formed indicating that the request is approved, the account security service 210 may transmit a notification to the authorization module 206 to indicate that the request can be approved. This may cause the authorization module 206 to access the identity management service 214 to make the requested configuration change to the account. Additionally, the authorization module 206 may transmit a notification to the user client 202 to indicate that the request has been fulfilled.

In some embodiments, the account security service 210, based at least in part on the response from the administrators 212 and other security principals for the account, enables the customer to make additional configuration changes to the account for a period of time. For instance, the notification from the account security service 210 may indicate the duration of this period of time during which the customer may make changes to the account. The authorization module 206 may thus process any customer requests received from the customer during this defined period of time without need to obtain additional approval from the account security service 210. If the period of time defined by the account security service 210 has passed, requests from the customer to make changes to the configuration of the account may need to be approved by a quorum formed by the administrators 212 and other security principals of the account. In some embodiments, if the period of time has elapsed, the account security service 210 will access the account to return the account to a default configuration, as specified in the account database 218.

Figure 3:
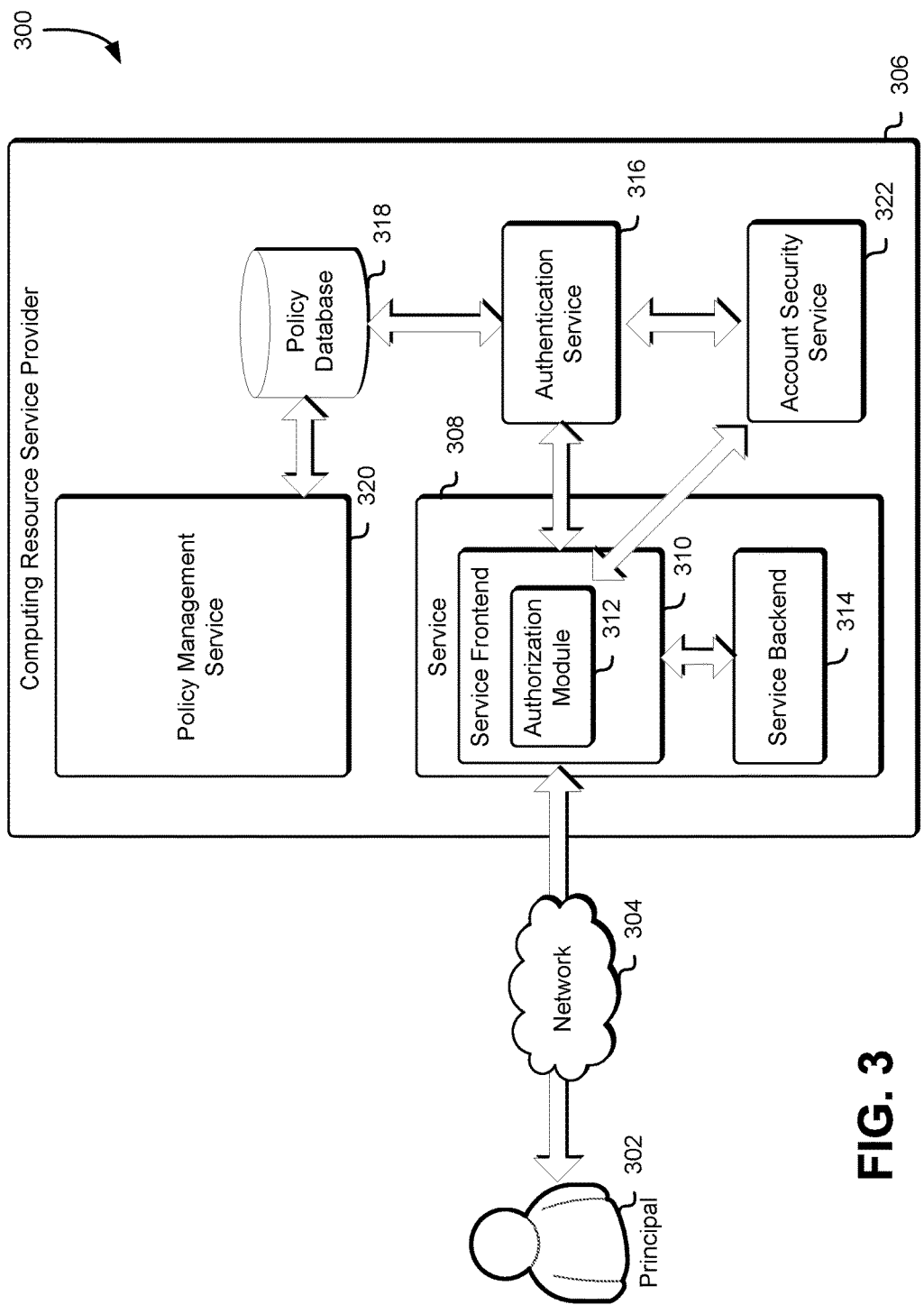
FIG. 3 shows an illustrative example of an environment in which a request to access and change the configuration of an account is fulfilled or denied based at least in part on policies applicable to a principal and a determination by one or more administrators of the account in accordance with at least one embodiment.

FIG. 3 shows an illustrative example of an environment 300 in which a request to access and change the configuration of an account is fulfilled or denied based at least in part on policies applicable to a principal 302 and a determination by one or more administrators of the account in accordance with at least one embodiment. In an embodiment, a principal 302 uses a computing device to communicate over a network 304 with a computing resource service provider 306. Communications between the computing resource service provider 306 and the principal 302 may, for instance, be for the purpose of accessing a service 308 operated by the computing resource service provider 306, which may be one of many services operated by the computing resource service provider 306. The service 308 may comprise a service frontend 310 and a service backend 314. The principal 302 may issue a request for access to a service 308 (and/or a request for access to resources associated with the service 308) provided by a computing resource service provider 306. The request may be, for instance, a web service application programming interface request. The principal 302 may be a user, or a group of users, or a role associated with a group of users, or a process representing one or more of these entities that may be running on one or more remote (relative to the computing resource service provider 306) computer systems, or may be some other such computer system entity, user, or process. Each user, group, role, or other such collection of principals may have a corresponding user definition, group definition, role definition, or other definition that defines the attributes and/or membership of that collection. For example, a group may be a group of principals that have the same geographical location. The definition of that group of principals may include the membership of the group, the location, and other data and/or metadata associated with that group. As used herein, a principal is an entity corresponding to an identity managed by the computing resource service provider, where the computing resource service provider manages permissions for the identity and where the entity may include one or more sub-entities, which themselves may have identities.

The principal 302 may communicate with the computing resource service provider 306 via one or more connections (e.g., transmission control protocol (TCP) connections). The principal 302 may use a computer system client device to connect to the computing resource service provider 306. The client device may include any device that is capable of connecting with a computer system via a network, such as example devices discussed below. The network 304 may include, for example, the Internet or another network or combination of networks discussed below.

The computing resource service provider 306, through the service 308, may provide access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Other example resources include, but are not limited to user resources, user accounts, policy resources, network resources and/or storage resources. In some examples, the resources associated with the computer services may be physical devices, virtual devices, combinations of physical and/or virtual devices, or other such device embodiments.

The request for access to the service 308 may be received by a service frontend 310, which, in some examples, comprises a web server configured to receive such requests and to process them according to one or more policies associated with the service 308. The request for access to the service 308 may be a digitally signed request and, as a result, may be provided with a digital signature. The service frontend 310 may send the request and the digital signature for verification to an authentication service 316. The authentication service 316 may be a stand-alone service or may be part of a service provider or other entity. The authentication service 316, in an embodiment, is a computer system configured to perform operations involved in authentication of principals. In some examples, requests submitted to the service frontend 310 are digitally signed by the principal (i.e., by a computing device used by or operating on behalf of the principal 302) using a symmetric cryptographic key that is shared between the principal 302 and the authentication service 316. The authentication service, therefore, may use a copy of the symmetric cryptographic key to verify digital signatures of requests purported to have been generated by the principal 302. However, in other embodiments, the authentication service 316 may utilize asymmetric cryptography for digital signature verification such as, for example, in response to the principal digitally signing requests using a private cryptographic key. In such embodiments, the authentication service will trust a certificate authority that digitally signed a certificate of the principal 302 corresponding to the private cryptographic key. Consequently, in some embodiments, the authentication service will use a public cryptographic key specified by the certificate.

If the request is successfully authenticated, the authentication service 316 may obtain policies applicable to the request. A policy may be applicable to the request by way of being associated with the principal 302, a resource to be accessed as part of fulfillment of the request, a group in which the principal 302 is a member, a role the principal 302 has assumed, and/or otherwise. Additionally, the policy may be applicable to the request by way of being associated with the account specified in the request from the principal 302. To obtain policies applicable to the request, the authentication service 316 may transmit a query to a policy database 318 managed by a policy management service 320.

The query to the policy database 318 may be a request comprising information sufficient to determine a set of policies applicable to the request, including any conditional computing resource policies that may specify one or more dependency conditions to other computing resources and policies applicable to these other computing resources. The query to the policy database may, for instance, contain a copy of the request and/or contain parameters based at least in part on information in the request, such as information identifying the principal, the resource, and/or an action (operation to be performed as part of fulfillment of the request). The policy database 318 may be a database or other system operable to process queries. The policy database 318 may process queries by providing records and/or other such data applicable to the request and/or responsive to the queries. Note that, if authentication of the request is unsuccessful (e.g., because a digital signature could not be verified), policies applicable to the request and/or usage data associated with the policy may not be provided to the requester.

Having obtained any policies applicable to the request, the authentication service 316 may provide an authentication response and, if applicable, the obtained policies back to the service frontend 310. The authentication response may indicate whether the response was successfully authenticated. The service frontend 310 may check whether the fulfillment of the request for access to the service 308 would comply with the obtained policies using an authorization module 312. An authorization module 312 may be a process executing on the service frontend that is operable to compare the request to the one or more permissions in the policy to determine whether service may satisfy the request (i.e., whether fulfillment of the request is authorized). For example, the authorization module may compare an API call associated with the request against permitted API calls specified by the policy to determine if the request is allowed. If the authorization module 312 is not able to match the request to a permission specified by the policy, the authorization module 312 may execute one or more default actions such as, for example, providing a message to the service frontend that causes the service frontend to deny the request, and causing the denied request to be logged in the policy management service 320. If the authorization matches the request to one or more permissions specified by the policy, the authorization module 312 may resolve this by selecting the least restrictive response (as defined by the policy) and by informing the service frontend whether the fulfillment of the request is authorized (i.e., complies with applicable policy) based on that selected response. The authorization module 312 may also by select the most restrictive response or may select some other such response and inform the service frontend whether the fulfillment of the request is authorized based on that selected response. Note that, while FIG. 3 shows the authorization module 312 as a component of the service frontend 310, in some embodiments, the authorization module 312 is a separate service provided by the computing resource service provider 306 and the frontend service may communicate with the authorization module 312 over a network.

In an embodiment, if the request from the principal 302 is to change the configuration of an account, the authorization module 312 submits a request to the account security service 322 to determine whether the account is immutable. The account security service 322 may evaluate an account database to identify an entry corresponding to the account specified in the request. As noted above, an administrator or other security principal of the account may access the account security service 322 to designate the account as immutable such that any requests to change the configuration of the account may need to be approved by a quorum of administrators and security principals in order for the requests to be fulfilled. If an account is designated as immutable, the account security service 322 may update an entry for the account in the account database to indicate that the account is immutable. Thus, in response to the request from the authorization module 312, the account security service 322 may evaluate the entry for the account in the account database to determine if the account is immutable. If the account is not immutable (e.g., the configuration of the account may be modified without administrator approval), the account security service 322 may transmit a notification to the authorization module 312 to indicate that the request may be fulfilled. This may cause the authorization module to transmit instructions to the service backend 314 to perform the operations necessary to modify the configuration of the account as requested. Further, the authorization module 312 may cause the service frontend 310 to notify the principal 302 to indicate that the request has been fulfilled.

If the account security service 322 determines that the account is immutable, the account security service 322 may utilize the account database to identify the group of administrators and security principals that are authorized to approve requests to change the configuration of the account. Additionally, or alternatively, the account security service 322 may identify a notification subject to which notifications regarding the account may be published for delivery to the group of administrators and security principals. Each administrator and security principal of the account may be subscribed to the subject such that the notification service that maintains the subject may transmit the notification to the administrators and security principals. The notification published to the subject may specify the account identifier, the entity making the request to modify the configuration of the account, and the requested change to the configuration of the account.

The account security service 322 may receive responses from the administrators and security principals of the account regarding whether to approve the configuration change request from the principal 302. The account security service 322 may evaluate these responses from administrators of the immutable account to determine whether a quorum may be reached in order to make a determination as to whether a configuration change to the account may be made. A quorum rule may specify that a minimum number of administrators are required to approve the configuration change in order for the request from the principal 302 to change the configuration of the account to be fulfilled. If a quorum cannot be reached for a particular configuration change request, the account security service may determine whether a timeout period has elapsed for the request or if a quorum remains possible after evaluation of the received administrator responses. If the timeout period has elapsed or a quorum is not possible, the account security service 322 may determine that the configuration change request cannot be fulfilled. If the configuration change request cannot be fulfilled, the account security service 322 may transmit a notification to the authorization module 312 to indicate that the request is denied. The notification may include a message that may include contact information for an administrator or security principal of the account and other information that the principal 302 may use to address the rejection of its request.

If a quorum of administrators and security principals that have approved the request is formed, the account security service 322 may transmit a notification to the authorization module 312 to indicate that the request has been approved. This may cause the authorization module 312 to access the account to make the requested configuration change on behalf of the principal 302. Alternatively, the authorization module 312 may enable the principal 302 to access the account and make the requested configuration change. Thus, the principal 302 may access the account to make the desired configuration change. In some embodiments, the account security service 322 updates the account database to denote the changes to the configuration of the account. The account security service 322 may also maintain, in the account database, the default configuration of the account. This may allow administrators and security principals to identify any configuration changes and return the account to its default configuration at any time. In some instances, the account security service 322 may allow the principal 302 to make changes to the account for a period of time. After the period of time has elapsed, the account security service 322 may return the account to its default configuration as specified in the account database.

As noted above, an administrator or other security principal of an account may access an account security service to designate the account as being immutable. The account security service may present the administrator or other security principal with a user interface, which the administrator or other security principal may use to identify the accounts that the administrator or other security principal is authorized to manage. Additionally, the account security service may provide, through the interface, options for selecting the accounts that are to be immutable. Accordingly, FIG. 4 shows an illustrative example of a user interface 400 provided by an account security service for making one or more accounts immutable in accordance with at least one embodiment.

The user interface 400 may include an account window that is used to specify the one or more accounts that the administrator or other security principal is authorized to manage. The account window may include a lock settings element 402 and an account name element 404. The account name element 404 may include an entry for each account that the administrator or other security principal is authorized to manage. The account security service may populate the account name element 404 of the account window based at least in part on one or more policies associated with the user of the user interface 400 and obtained from a policy database in response to a request from the user to access the account security service. The one or more policies may specify account identifiers for accounts that the administrator or other security principal is authorized to manage. The account security service may thus populate the account name element 404 with the account identifiers specified in the one or more policies.

In addition to presenting the account identifiers for each account that the administrator or other security principal can manage, the account security service may present, within the lock settings element 402, a check box 406 that may be used to denote if the account is to be designated as immutable. For instance, if the administrator or other security principal wants to designate an account as immutable, the administrator or other security principal may select the check box 406 corresponding to the account identifier specified in the account name element 404 such that the check box 406 is checked. In some instances, if the administrator or other security principal has designated an account as being immutable, the account security service may present the administrator or security principal with the check box 406 for the account such that the check box 406 is checked. Thus, the administrator or other security principal may determine whether an account has been designated as immutable or not. While check boxes are used for the purpose of illustration, other interfaces may be used to denote whether an account is designated as immutable such as radio buttons, drop down menus, and the like.

The user interface 400 may further include a custom message window 408. The administrator or other security principal may use the custom message window 408 to generate a custom message that can be displayed to users that attempt to change the configuration of the immutable accounts and are denied. For instance, if a user submits a request to a computing resource service to change the configuration of an account, the computing resource service may transmit the request to the account security service, which may determine whether the account is immutable. If the account is immutable, the account security service may query the administrators and security principals for the account to determine whether the request is approved. If the request is not approved, the account security service may provide the custom message provided by the administrator or other security principal in the custom message window 408 to the computing resource service. This may cause the computing resource service to present the custom message to the user.

If the administrator or security principal may select the submit button 410 to accept all changes made to the user interface 400. In response to detecting selection of the submit button 410, the account security service may update the account database to designate the selected accounts as immutable. Additionally, the account security service may add the custom message specified in the custom message window 408 to the entry for each account designated as immutable. The account security service may use this account database to determine whether an account is immutable, identify the custom message to be presented if a request to change the configuration of an immutable account is denied, and the administrators and security principals authorized to determine whether the request to change the configuration of the account can be approved.

It should be noted that the user interface 400 is illustrative of an example interface for changing the mutability of one or more accounts. Thus, user interfaces may include additional and/or alternative elements that may be utilized to change the mutability of one or more accounts, as well as the mutability of certain features of the one or more accounts. For instance, through the user interface 400, an administrator or other security principal may select an individual account from the accounts specified to identify the various features of the account. Further, the administrator or other security principal may select individual features of the account that are to be designated as immutable. Thus, while an account as a whole may not be designated as immutable, individual features of the account may be designated as immutable by the administrator or other security principal. If a user attempts to change the configuration of any of these features, the account security service may notify the one or more administrators and security principals of the account to determine whether a change to the configuration of the particular feature of the account is approved.

Figure 5:
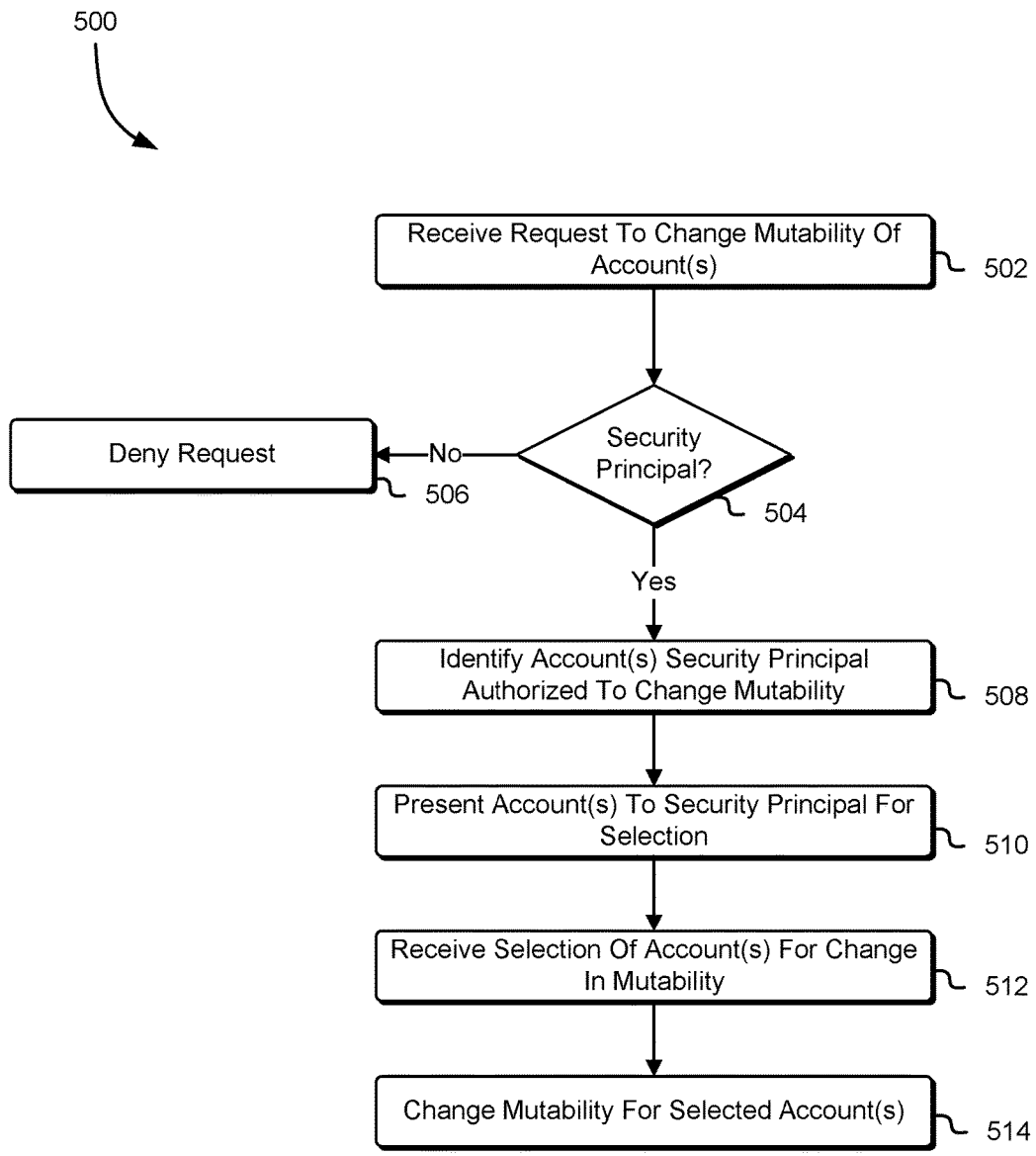
FIG. 5 shows an illustrative example of a process for changing the mutability of an account in order to make configuration changes to the account subject to administrator approval or to enable configuration changes to the account without need for approval in accordance with at least one embodiment.

As noted above, an administrator or other security principal may use an interface provided by the account security service to request that an account be designated as being immutable. As a result of an account being designated as immutable, the account security service may lock the configuration of the account such that requests to change the configuration of the account are now subject to approval by one or more administrators or security principals of the account. Similarly, an administrator or other security principal may use the interface to request that an immutable account be made mutable, thus enabling users of the account to change the configuration of the account without need for an additional approval workflow. Accordingly, FIG. 5 shows an illustrative example of a process 500 for changing the mutability of an account in order to make configuration changes to the account subject to administrator approval or to enable configuration changes to the account without need for approval in accordance with at least one embodiment. The process 500 may be performed by the aforementioned account security service, which may identify the accounts that may be designated as immutable or mutable by an administrator or security principal and apply the designation to any selected accounts to prevent unauthorized modification of the selected accounts or to enable modification of the selected accounts, based at least in part on whether the selected accounts have been designated as immutable or mutable, respectively.

At any time, the account security service may receive 502 a request from a principal to change the mutability of one or more accounts. The principal may access the account security service via a client device and may provide credential information for authentication to the interface provided by the computing resource service provider or the account security service itself. The interface may utilize the provided credential information to generate a digital signature or hash that may be utilized for authentication. The credential information may include, among other things, a username, a corresponding password, biometric information, a cryptographic key, a unique identifier, a set of credentials, a hash of the set of credentials, a digital signature generated using a credential, a message authentication code generated based at least in part on a credential, and the like. The computing resource service provider may utilize the obtained digital signature or hash from the interface to authenticate the user and determine whether the user may utilize the interface to access the account security service. In some instances, authentication of the principal and/or of the request from the principal may be performed by the client device in response to receiving the credential information from the principal.

Further, the computing resource service provider or the account security service may utilize the obtained digital signature or hash from the interface to identify one or more policies applicable to the user to determine 504 whether the user is a security principal. For instance, the one or more policies may define the operations that may be performed by the user and any accounts that the user is authorized to manage. If, based at least in part on the obtained policies, the account security service determines that the user is not an administrator or other security principal of at least one account, the account security service may deny 506 the request to change the mutability of one or more accounts. In some embodiments, the account security service presents the user with an empty set of accounts such that no accounts are displayed to the user for designation.

If the account security service determines, based at least in part on the obtained policies applicable to the user, that the user is an administrator or security principal for at least one account, the account security service may identify 508 the one or more accounts that the user is authorized to manage and to change the mutability for the one or more accounts. For instance, the account security service may utilize the one or more applicable policies to determine the level of access the user has to various accounts specified in the policies. If the policies specify that the user is authorized to have full access (e.g., no limitations) to an account, the account security service may determine that the user is authorized to manage the account and, thus, change the mutability of the account. However, if the policies do not allow the user to manage an account specified in the policies, the account security service may determine that the user is not authorized to change the mutability of the account.

The account security service may update the interface presented to the user to present 510 the one or more accounts that the user may designate as immutable or as mutable. For instance, the account security service may present the one or more accounts in a manner as described above in connection with FIG. 4. If the user has designated an account as immutable during a previous session with the account security service, the account security service may update the interface to present an identifier for the account and to indicate that the account has been designated as immutable. Similarly, if the user has designated an account as mutable during a previous session with the account security service or the user has not changed the mutability of an account previously, the account security service may update the interface to present an identifier for the account to indicate that the account is designated as mutable. Through the interface, the user may select the one or more accounts that the user wants to designate as being immutable and/or modify the settings of any accounts that were designated as immutable during a previous session with the account security service. Additionally, the user may provide a custom message that may be presented to other users that attempt to change the configuration of an immutable account. For instance, if a request from another user to change the configuration of an immutable account is denied, the account security service may provide the custom message to the service that received the request. This may cause the service that received the request from the other user to present the custom message to the other user. The account security service may receive 512 the user's selection of the accounts for changes in mutability. This may include a selection of accounts that are to be designated as immutable as well as a selection of other accounts, which may have previously been designated as being immutable, that are to be designated as mutable.

Based at least in part on the user's selection of accounts, the account security service may change 514 the mutability of the selected accounts. For instance, if the administrator or other security principal has selected one or more accounts that are to be designated as being immutable, the account security service may access its account database to update an entry for each selected account to specify that the selected account is now immutable. As described in greater detail below, in response to a request from an authorization module of a computing resource service to determine whether an account is immutable, the account security service may utilize this account database to determine whether the entry for the account specifies that it is immutable. If the account is designated as being immutable, the account security service may transmit a notification to a group of administrators and other security principals that are authorized to determine whether the request to change the configuration of the immutable account may be approved. Thus, without the approval of this group of administrators and other security principals, a user may not change the configuration of an immutable account. Alternatively, if the administrator or other security principal has selected one or more accounts that were originally designated as immutable to be designated as being mutable, the account security service may access its account database to update an entry for each selected account to specify that the selected account is now mutable. Thus, if a user attempts to change the configuration of any of these accounts, an additional approval process need not be performed in order for the request to be fulfilled.

Figure 6:
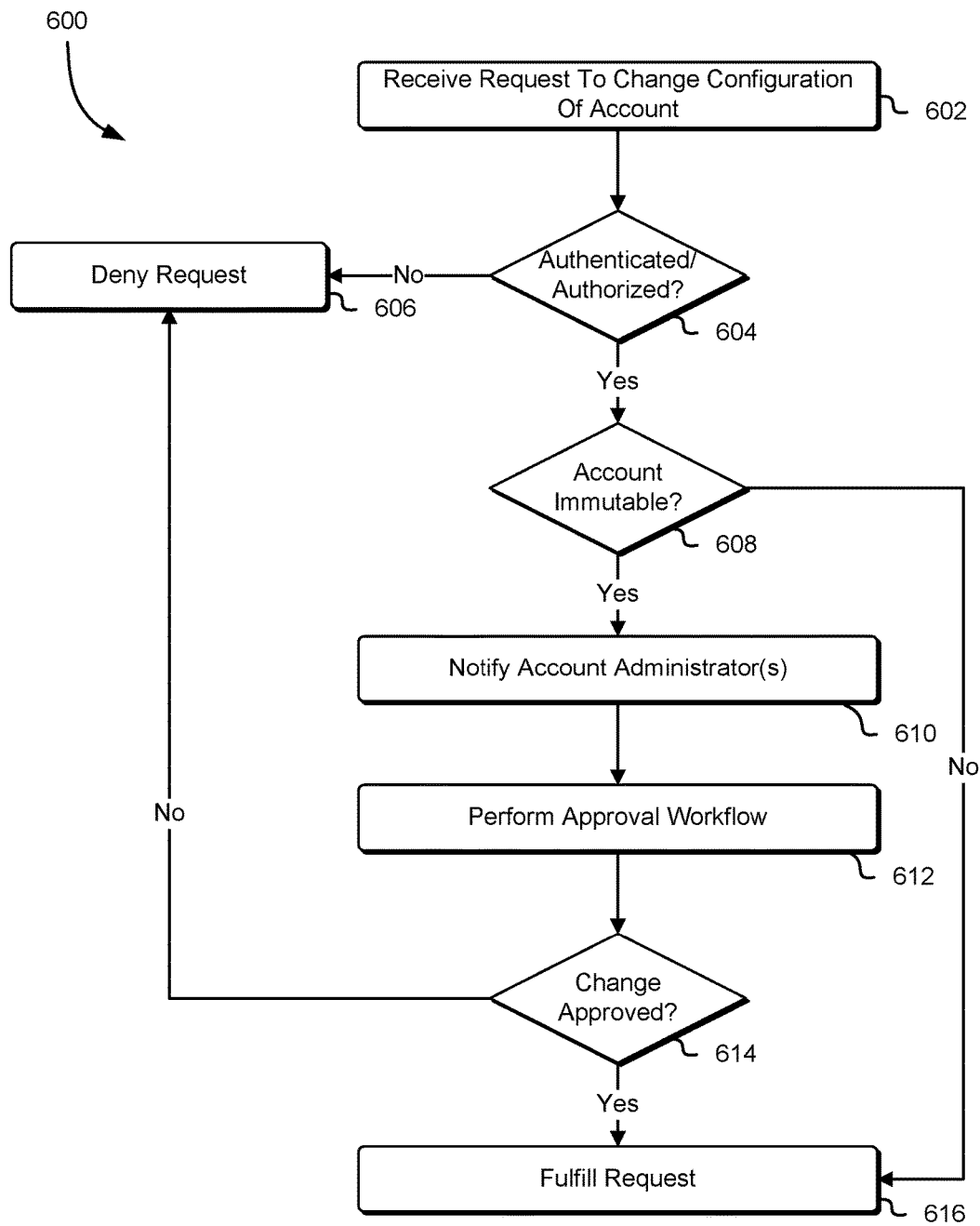
FIG. 6 shows an illustrative example of a process for evaluating and processing requests to change the configuration of an account in accordance with at least one embodiment.

As noted above, customers or other users of a computing resource service provider may submit a request to a computing resource service to change the configuration of an existing account. If the target account has been designated as being immutable, the computing resource service may, in conjunction with the account security service, determine whether the requested configuration change is approved by a group of administrators or other security principals for the account. Based at least in part on the determination by this group of administrators or security principals for the account whether the request is approved, the computing resource service may either fulfill the request or deny the request from the user. Accordingly, FIG. 6 shows an illustrative example of a process 600 for evaluating and processing requests to change the configuration of an account in accordance with at least one embodiment. The process 600 may be performed by any computing resource service provided by the computing resource service provider and in conjunction with the account security service, which may submit the request to a group of administrators and security principals for the target account for approval of the request, if required.

A customer or other user may access an interface of a computing resource service to access one or more accounts. Through use of the interface provided by the computing resource service via a user client, the customer or other user may transmit a request to a computing resource service to change the configuration of an account. In order for the customer to interact with the interface provided by the computing resource service provider and access the computing resource service, the customer may be required to provide credential information for authentication to a GUI, whereby an application associated with the GUI may utilize the provided credential information to generate a digital signature or hash that may be utilized for authentication. The credential information may include, among other things, a username, a corresponding password, biometric information, a cryptographic key, a unique identifier, a set of credentials, a hash of the set of credentials, a digital signature generated using a credential, a message authentication code generated based at least in part on a credential, and the like. Thus, the computing resource service may receive 602 the request from the customer or other user to change the configuration of the account. This request may include the aforementioned credential information necessary for determining whether the customer or other user can be authenticated and is authorized to perform the desired change to the account. Generally, the customer may authenticate in various ways in accordance with various embodiments.

The computing resource service provider may utilize the obtained digital signature or hash from the GUI to determine 604 whether the request can be authenticated and whether the customer or other user is authorized to perform the requested action. For instance, the computing resource service may provide the credential information to an authentication service for verification. The authentication service may evaluate the provided credential information to determine if the customer can be authenticated. If the customer cannot be authenticated, the authentication service may transmit a notification to the computing resource service indicating that the customer could not be authenticated. This may cause the computing resource service to deny 606 the request.

If the customer is successfully authenticated, the authentication service may obtain policies applicable to the request. A policy may be applicable to the request by way of being associated with the customer, the account to be accessed as part of fulfillment of the request, a group in which the customer is a member, a role the customer has assumed, and/or otherwise. Having obtained any policies applicable to the request, the authentication service may provide an authentication response and, if applicable, the obtained policies back to the computing resource service. The computing resource service may check whether fulfillment of the request for performance of the configuration change would comply with obtained policies. If the computing resource service is not able to match the request to a permission specified by the policy, the computing resource service may execute one or more default actions such as, for example, providing a message to the service that causes the service to deny 606 the request, and causing the denied request to be logged.

If the customer or other user is authorized to change the configuration of the account based at least in part on the obtained policies, the computing resource service may determine 608 whether the account has been designated as immutable. The computing resource service may transmit a request to the account security service to evaluate the request from the customer or other user and to determine whether the account is immutable. This may cause the account security service to access its account database, which may include entries for each account managed by the computing resource service provider. Each entry in the account database may specify if the corresponding account has been designated as being immutable. If the account security service determines, based at least in part on an entry for the account in the account database, that the account is not immutable, the account security service may transmit a notification to the computing resource service to indicate that the request may be fulfilled. In response to this notification, the computing resource service may fulfill 616 the customer's request to change the configuration of the account without executing an additional approval workflow. In some embodiments, fulfillment of the customer's request to change the configuration of the account can be performed synchronously or by causing a workflow to be performed that causes the request to be fulfilled without additional approvals.

If the account security service determines that the account has been designated as being immutable, the account security service may notify 610 a group of administrators and other security principals for the account to determine whether the requested change can be approved. For instance, the account security service may publish a notification to a subject of a notification service indicating the nature of the requested configuration change. The group of administrators and other security principals for the account may be subscribed to this subject such that the notification service may transmit the notification to each subscriber. In some embodiments, the account security service identifies electronic addresses associated with the administrators and other security principals for the account and uses these electronic addresses to transmit the notification to the administrators and other security principals. These electronic addresses may include electronic mail addresses, physical addresses, telephone numbers (e.g., for Short Message Service or Multimedia Messaging Service messages), Internet Protocol (IP) addresses, and the like. The account security service may obtain responses from the various administrators and other security principals for the account and perform 612 an approval workflow based at least in part on the received responses. For instance, as described in greater detail below, the account security service may utilize one or more quorum rules to determine whether a quorum is formed for a determination regarding the requested configuration change.

The account security service may use the outcome of the approval workflow to determine 614 whether the requested configuration change has been approved by the group of administrators and other security principals. If the configuration change request is not approved, the account security service may transmit a notification to the computing resource service to indicate that the request has not been approved by the group of administrators and other security principals for the account. The notification may include a custom message that specifies that the account has been locked, as well as other information that may be useful to the customer (e.g., administrator contact information, account information, etc.). In response to receiving the notification from the account security service, the computing resource service may deny 606 the request and present the custom message to the customer or other user.

Alternatively, if the account security service determines that the request has been approved, the account security service may transmit a notification to the computing resource service to indicate that the request can be fulfilled. In response to this notification, the computing resource service may fulfill 616 the request. For instance, the computing resource service may perform the requested configuration change to the account. The computing resource service may, alternatively, transmit a notification to the customer to indicate that it can perform the requested configuration change to the account. This may enable the customer to access the account and perform the requested configuration change.

Figure 7:
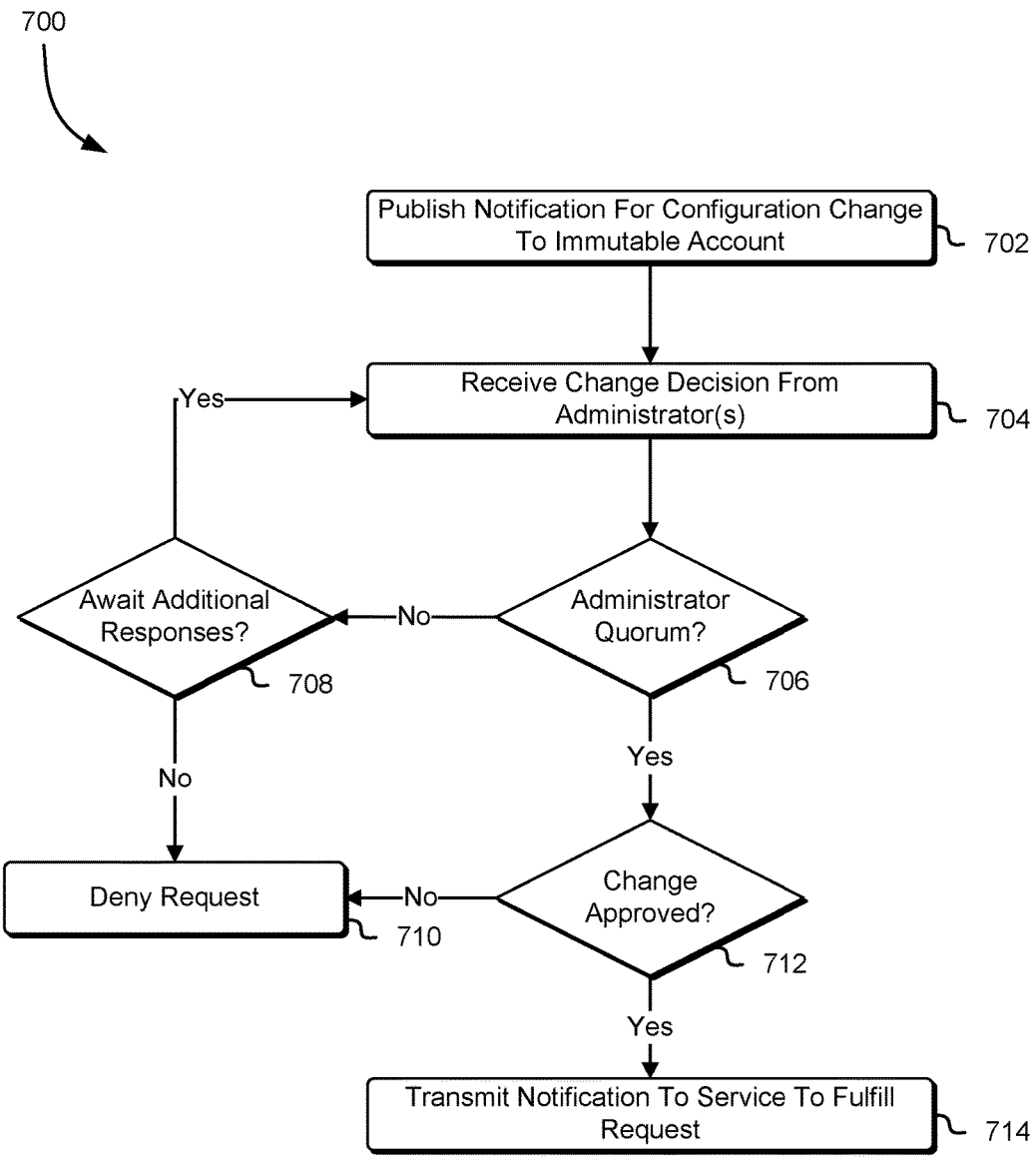
FIG. 7 shows an illustrative example of a process for determining whether to approve a request to change the configuration of an immutable account in accordance with at least one embodiment.

As noted above, in response to a request from a computing resource service to determine whether a configuration change to an immutable account can be fulfilled, the account security service may perform an approval workflow that involves obtaining responses from one or more administrators and security principals for the account. The account security service may utilize these responses from the one or more administrators and security principals for the account to determine whether a quorum has been formed indicating approval or rejection of the configuration change. Based at least in part on this determination, the account security service may transmit a notification to the computing resource service to indicate whether the request may be fulfilled or denied. Accordingly, FIG. 7 shows an illustrative example of a process 700 for determining whether to approve a request to change the configuration of an immutable account in accordance with at least one embodiment. The process 700 may be performed by the account security service, which may receive a request from a computing resource service to determine whether a configuration change request for an immutable account may be fulfilled. It should be noted that the process 700 may be part of the approval workflow discussed above in connection with FIG. 6.

In response to a request from a computing resource service to determine whether a configuration change to an immutable account is approved, the account security service may access the account database to identify an identifier for a subject to which administrators and other security principals for the account are subscribed. The subject may be maintained by a notification service of the computing resource service provider. Messages published to the subject may be transmitted to each subscriber to the subject, based at least in part on the subscription settings provided by each subscriber. The account security service may publish 702 a notification regarding the requested configuration change to the identified subject. This may cause the notification service to transmit the notification to each administrator and security principal subscribed to the subject. Further, the notification may enable an administrator or security principal of the account to either approve or deny the requested configuration change.

An administrator or security principal that receives the notification from the notification service may determine whether to approve or deny the requested configuration change. The administrator or security principal may provide its determination to the account security service, which may receive 704 the decision from the administrator or security principal and aggregate this decision with other responses from other administrators and security principals for the account. The account security service may evaluate the decisions received from administrators and other security principals for the account to determine 706 whether an administrator quorum has formed. For instance, the account security service may evaluate responses from administrators of the immutable account to determine whether a quorum may be reached in order to make a determination as to whether a configuration change to the account may be made.

As an illustrative example, a quorum rule may specify that a minimum number of administrators are required to approve the configuration change in order for the request from the customer to change the configuration of the account to be fulfilled. If a quorum cannot be reached for a particular configuration change request, the account security service may determine 708 whether to await additional responses from other administrators of the account. For instance, the account security service may determine whether a timeout period has elapsed for the request or if a quorum remains possible after evaluation of the received administrator responses. If the timeout period has elapsed or a quorum is not possible, the account security service may determine that the configuration change request cannot be fulfilled. Thus, the account security service may transmit a notification to the computing resource service to deny 710 the request. However, if the timeout period has not passed or a quorum is still possible, the account security service may await additional responses from the administrators and security principals for the account. In some embodiments, a failure to respond to the notification from the notification service can be considered as an implicit approval of the configuration change request. Additionally, whether explicit approval is required to indicate approval of the configuration change request may be account specific and controlled through one or more attributes of the account that can be set by the administrators of the account.

It should be noted that while quorums requiring a minimum number of responses indicating approval or denial of a configuration change are used throughout the present disclosure for illustrative purposes, quorums may be defined based at least in part on different criteria. For example, a quorum may be reached when a majority of the administrators have returned a response indicating approval of the configuration change. Alternatively, a quorum may be reached if a minimum number of responses indicating approval of the configuration change are received, regardless of the size of the group of administrators and other security principals having the authority to approve or deny configuration changes for an immutable account. However, this minimum number may also be greater than two in some instances. In other embodiments, each administrator of the group of administrators is assigned a distinct weight based at least in part on the hierarchical position of the administrator. For instance, a greater weight may be assigned to an administrator that has a higher position in the hierarchy of administrators. Alternatively, a lower weight may be assigned to an administrator that has a lower position in the hierarchy of administrators. This weighing may be used to generate a score that may be used to determine whether a quorum has been formed for the approval of a requested configuration change to the immutable account.

If an administrator quorum has been formed, the account security service may determine 712 whether the configuration change has been approved by the quorum. If the quorum of administrators and security principals has determined that the request is not approved, the account security service may transmit a notification to the computing resource service that may cause the computing resource service to deny 710 the request from the customer to change the configuration of the immutable account. Additionally, the account security service may transmit a custom message prepared by an administrator or security principal for the account specifying that the account has been locked to prevent unauthorized changes to the account. The custom message may specify administrator contact information as well as other account information that may be useful to the customer.

However, if the account security service determines that the configuration change to the immutable account has been approved by the quorum, the account security service may transmit 714 a notification to the computing resource service to indicate that the configuration change request has been approved. In response to this notification, the computing resource service may fulfill the request. For instance, the computing resource service may grant the customer access to the account to perform the requested configuration change. Alternatively, the computing resource service may perform the requested configuration change on behalf of the customer. The computing resource service may notify the customer that the configuration change has been performed.

Figure 8:
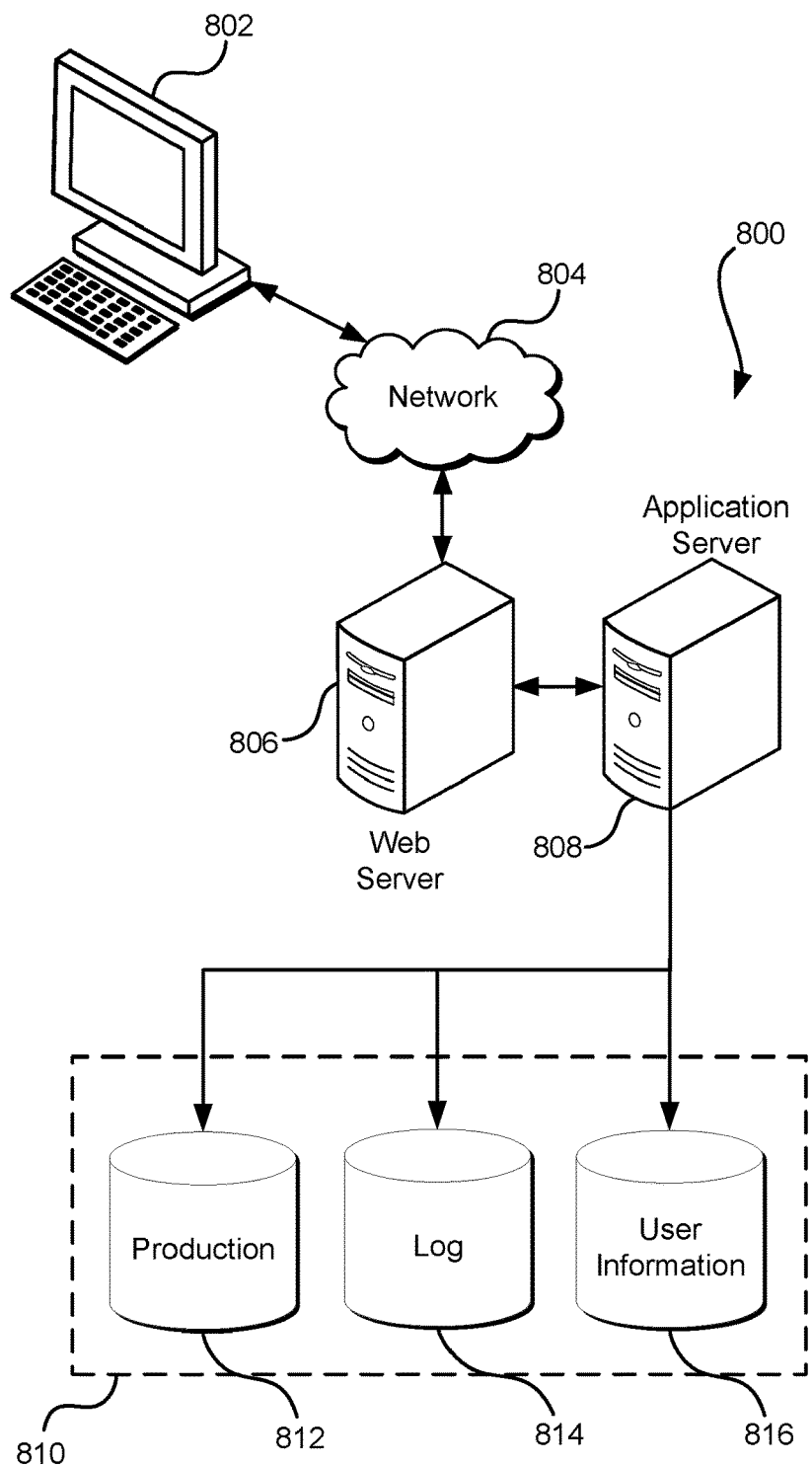
FIG. 8 shows an illustrative example of an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining a request, from a client device, to change a configuration of a computing resource service provider account;
    determining, based at least in part on attributes of the computing resource service provider account, that the computing resource service provider account is designated as being immutable;
    transmitting a notification to one or more electronic addresses associated with administrators authorized to determine whether requests to change the configuration of the computing resource service provider account can be fulfilled;
    obtaining one or more responses from the one or more electronic addresses associated with the administrators that individually indicate authorization to fulfill the request;
    determining whether a quorum of administrators have authorized the request to be fulfilled; and
    fulfilling, while maintaining designation of the computing resource service provider account as being immutable, the request as a result of determining that the quorum of administrators have authorized the request to be fulfilled.

2. The computer-implemented method of claim 1, further comprising:
    obtaining a second request to change a configuration of a second computing resource service provider account;
    determining, based at least in part on attributes of the second computing resource service provider account, that the second computing resource service provider account is not immutable; and
    fulfilling the second request without executing an additional approval workflow.

3. The computer-implemented method of claim 1, further comprising:
    obtaining a second request to change the configuration of the computing resource service provider account;
    transmitting a second notification to the one or more electronic addresses associated with the administrators authorized to determine whether the requests to change the configuration of the computing resource service provider account can be fulfilled;
    determining that the quorum of administrators have not authorized the request to be fulfilled; and
    denying the request as a result of determining that the quorum of administrators have not authorized the request to be fulfilled.

4. The computer-implemented method of claim 1, wherein the computing resource service provider account is made immutable in response to a request from a client device of an administrator to change the attributes of the computing resource service provider account to designate the computing resource service provider account as being immutable.

5. A system, comprising:
    one or more processors; and
    memory including instructions that, as a result of being executed by the one or more processors, cause the system to:
        obtain a request to perform a change to a configuration of a service provider account;
        determine that the service provider account is designated as being immutable;
        transmit a notification to an electronic address associated with an administrator of the service provider account;
        determine, based at least in part on a response from the administrator, whether a quorum of administrators has authorized the change to the configuration of the service provider account; and
        in response to a determination that the quorum has authorized the change to the configuration of the service provider account, maintain the service provider account as being immutable in concurrence with fulfillment of the request.

6. The system of claim 5, wherein the instructions further cause the system to:
    obtain a second request to perform a change to a configuration of a second service provider account;

determine that the second service provider account is not designated as being immutable; and fulfill the second request subject to one or more policies associated with the request.

7. The system of claim 5, wherein the instructions further cause the system to:

obtain a second request to perform a change to the configuration of the service provider account:

transmit a second notification to the electronic address associated with the administrator of the service provider account;

determine, based at in part on a second response from the administrator, whether a second quorum of administrators has authorized the change to the configuration of the service provider account; and deny the request as a result of a second determination that the second quorum has not authorized the change to the configuration of the service provider account.

8. The system of claim 5, wherein the instructions further cause the system to:

receive, from a client device of the administrator of the service provider account, to, a request to change one or more attributes of the service provider account to change mutability of the service provider account; and fulfill the request by changing the one or more attributes of the service provider account.

9. The system of claim 5, wherein the instructions that cause the system to determine whether the quorum of administrators has authorized the change to the configuration of the service provider account further cause the system to await additional responses from administrators of the service provider account as a result of the quorum of administrators not having formed.

10. The system of claim 5, wherein the instructions further cause the system to transmit a notification indicating that the service provider account is designated as being immutable as a result of the quorum having not authorized the change to the configuration of the service provider account.

11. The system of claim 5, wherein the instructions further cause the system to revert the service provider account to a default configuration in response to detecting that the change to the configuration of the service provider account is no longer required.

12. The system of claim 5, wherein the instructions further cause the system to transmit a notification to an electronic address of a requestor that submitted the request to indicate that the request has been fulfilled.

13. A non-transitory computer-readable storage medium that stores executable instructions that, as a result of being executed by one or more processors of a computer system, cause the computer system to at least:

determine, in response to a request to perform a change to a configuration of a service provider account, whether the service provider account is designated as being immutable;

as a result of the service provider account being immutable, transmit a notification to one or more electronic addresses associated with administrators authorized to determine authorization of requests to change the configuration of the service provider account;

determine whether a quorum among the administrators has authorized the change; and as a result of a determination that the quorum has authorized the change, fulfill the request while maintaining designation of the service provider account as being immutable.

14. The non-transitory computer-readable storage medium of claim 13, wherein the instructions further cause the computer system to:

transmit, in response to a second request to perform the change to the configuration of the service provider account, a second notification to the one or more addresses associated with the administrators; and deny the request as a result of a determination that a second quorum has not authorized the change to the configuration of the service provider account.

15. The non-transitory computer-readable storage medium of claim 13, wherein the instructions that cause the computer system to determine whether the quorum among the administrators has authorized the change further cause the computer system to await additional responses as a result of the quorum not being formed.

16. The non-transitory computer-readable storage medium of claim 13, wherein the instructions further cause the computer system to transmit a notification to a client device of a requestor that submitted the request to indicate that the service provider account is immutable as a result of the quorum not authorizing the change to the configuration of the service provider account.

17. The non-transitory computer-readable storage medium of claim 13, wherein the instructions that cause the computer system to determine whether the service provider account is immutable further cause the computer system to evaluate an entry in a service account database corresponding to the service provider account to identify a designation for the service provider account indicating whether the service provider account is immutable.

18. The non-transitory computer-readable storage medium of claim 13, wherein the instructions further cause the computer system to restore the service provider account to a default configuration in response to detecting that the change to the configuration of the service provider account has expired.

19. The non-transitory computer-readable storage medium of claim 13, wherein the service provider account is made immutable in response to a request from a client device of an administrator to designate the service provider account as being immutable.

20. The non-transitory computer-readable storage medium of claim 13, wherein the instructions further cause the computer system to fulfill the request without executing an additional approval workflow as a result of the service provider account being mutable.

* * * * *